United States Patent
Utsumi et al.

(10) Patent No.: US 7,822,502 B2
(45) Date of Patent: Oct. 26, 2010

(54) METHOD OF CALCULATING COORDINATES AT CUTTING WORK COMPLETION IN SHOULDER CUTTING BY MEANS OF ROTATING TOOL

(75) Inventors: Koji Utsumi, Kawasaki (JP); Masayuki Kyoi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 362 days.

(21) Appl. No.: 11/964,114

(22) Filed: Dec. 26, 2007

(65) Prior Publication Data

US 2008/0215177 A1    Sep. 4, 2008

(30) Foreign Application Priority Data

Jan. 11, 2007   (JP) .............................. 2007-002940

(51) Int. Cl.
*G06F 19/00* (2006.01)
(52) U.S. Cl. ...................................... 700/173; 700/174
(58) Field of Classification Search ................. 700/172, 700/173
See application file for complete search history.

(56) References Cited

U.S. PATENT DOCUMENTS

2007/0179661 A1 * 8/2007 Onozuka et al. ............ 700/173

2007/0201956 A1 * 8/2007 Onozuka et al. .............. 407/30

OTHER PUBLICATIONS

Y. Altintas, et al., "Analytical prediction of Stability Lobes in Milling", Annals of the CIRP, vol. 44, No. 1 (1995), p. 357-362.

* cited by examiner

*Primary Examiner*—Ryan A Jarrett
(74) *Attorney, Agent, or Firm*—Antonelli, Terry, Stout & Kraus, LLP.

(57) ABSTRACT

Using parameters such as diameters of a rough cutter and a finishing cutter, a position of a tool at cutting work completion in a rough work, a finishing cutting area, specifications of a rotating tool (the number of cutting edges, a cutting force eigenvalue, a compliance transfer function), etc., a cutting force acting on a cutting edge of the rotating tool is found, and results thereof are made use of to analyze a characteristic equation being a loop transfer function of a vibration system composed of the rotating tool and a work, whereby it is possible to predict presence of generation of self-excited vibration of the finishing cutter performed after a rough work in a shoulder cutting work. Thereby, the rotating tool operates stably in a finishing work and besides shoulder cutting of a work can be performed in a high work efficiency.

3 Claims, 7 Drawing Sheets

| y' | z' | PRESENCE OF OCURRENCE OF VIBRATION | EFFICIENCY (CUTTING AREA) |
|----|----|-----------------------------------|---------------------------|
| 7  | 1  | ABSENT                            | 132                       |
| 7  | 2  | ABSENT                            | 145                       |
| 7  | 3  | ABSENT                            | 158                       |
| 7  | 4  | ABSENT                            | 171                       |
| 7  | 5  | PRESENT                           |                           |

FIG. 11a

INITIAL WORKING CONDITION
SELF-EXCITED VIBRATION PRESENT ( Rmax = 23 μm )

WORKING CONDITION BASED ON PREDICTED RESULTS
SELF-EXCITED VIBRATION ABSENT ( Rmax = 7.8 μm )

10 μm 1 mm

METHOD OF CALCULATING COORDINATES AT CUTTING WORK COMPLETION IN SHOULDER CUTTING BY MEANS OF ROTATING TOOL

This application claims the benefit of priority from the prior Japanese Patent Application No. 2007-002940, filed Jan. 11, 2007, the contents of which are incorporated herein by reference.

BACKGROUND OF THE INVENTION

The present invention relates to optimization of coordinates of a rough cutting tool at cutting work completion, which optimization is essential in order to suppress self-excited vibration responsible for a decrease in machining accuracy and breakage of a rotating tool or a milling cutter and to perform a stable finish cutting work, in a so-called shoulder cutting, in which a milling cutter is moved to work a groove and a periphery of a boss while rotating.

In a cutting work with a milling cutter, a milling cutter is in some cases low in stiffness to be responsible for generation of that relative vibration between the milling cutter, which vibration is classified into forced vibration and self-excited vibration. A cutting edge of the milling cutter passes through the work to cause a cutting force to act between the milling cutter and the work and the cutting force generates relative displacement whereby the former forced vibration is generated. At this time, the milling cutter or the work vibrates at a cutting frequency determined by a product of the rotating speed of the milling cutter and the number of cutting edges thereof, and in the case where vibration is great, noise and vibration of a milling machine are generated.

On the other hand, with the latter self-excited vibration, there is generated vibration having a frequency close to a natural frequency of the milling cutter. Such vibration has a feature in that it does not occur just after cutting is begun, but vibration is gradually amplified as cutting proceeds. In this case, a natural frequency of a mechanical system is generally several hundreds Hz in many cases and so noise due to the vibration becomes a relatively high sound.

There is established an approach, in which the self-excited vibration is modeled by the regenerative theory of vibration as exemplified by, for example, Y. Altintas and E. Budak: Analytical Prediction of Stability Lobes in Milling, Annals of the CIRP Vol. 44, No. 1 (1995) pages 357 to 362 and predicted in numerical analysis. In the theory, a matter that a milling cutter is increased in vibration together with cutting is called a regenerative effect. Specifically, the self-excited vibration is a phenomenon that in a single-degree-of-freedom analytic model shown in FIG. 1, when a wave surface, which is formed by a cutting edge of a milling cutter 1 one cycle ago cutting a work 2 while vibrating, is cut by a cutting edge, which passes next time, a cutting area 3 become wave-shaped as shown in FIG. 1 and vibration of the milling cutter, which is generated due to variation of a chip thickness of the work 2, is increased as cut proceeds.

Figure 1:
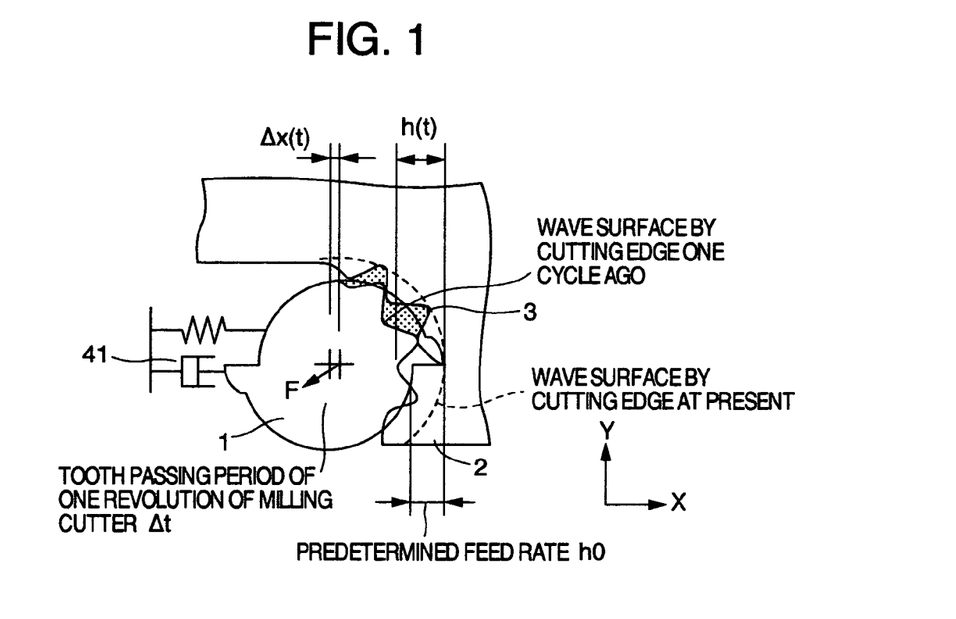
FIG. 1 is a schematic drawing illustrating a state, in which a milling cutter cuts a work while the milling cutter vibrates (case of a single-degree-of-freedom analytic model in the regenerative theory)

In FIG. 1, a chip thickness h(t) of the work 2 at time t is represented by the equation (1) with the use of a tooth passing period $\Delta t$, a displacement $\Delta x(t)$ of the milling cutter, and a chip thickness at first according to a working condition, that is, a feed rate $h_0$.

$$h(t) = h_0 - \Delta x(t - \Delta t) + \Delta x(t) \tag{1}$$

On the other hand, in the case of the single-degree-of-freedom shown in FIG. 1, an equation of motion of the milling cutter is represented by the equation (2) with the use of a mode mass m, which is a factor to determine a compliance transfer function 41, a spring constant k, a damping ratio c, and an external force F.

$$F = m\ddot{x} + c\dot{x} + kx \tag{2}$$

Also, the external force F in the above-mentioned equation is a cutting force acting between the milling cutter 1 and the work 2 and can be represented by the equation (3) with the use of a chip thickness h(t), an axial depth (a) of cut (an amount, by which the milling cutter 1 cuts in a direction perpendicular to a plane of the drawing in FIG. 1), and a proportional constant K, that is, a cutting constant K determined by a combination of a tool geometry and a work material.

$$F = aKh(t) \tag{3}$$

Accordingly, the equation of motion of the milling cutter 1 is given by the equation (4) from the equation (2) and the equation (3).

$$m\ddot{x} + c\dot{x} + kx = aKh(t) \tag{4}$$

It is possible to evaluate a transfer function of the system represented by the equation (1) and the equation (4) to calculate a stable axial depth (a) of cut for various tooth passing periods $\Delta t$.

The tooth passing period $\Delta t$ can be converted into a rotational frequency when the number of cutting edges of the milling cutter is known. By beforehand predicting a chatter-free axial depth (a) of cut to form a NC program, correction of the NC program due to generation of self-excited vibration is made unnecessary, thus enabling a remarkable reduction in man-hour. In view of a vibrational degree of freedom in X direction and in Y direction, it is possible to obtain a stability lobes in a short period of time without repeatedly calculating an acceleration, velocity and displacement acting between the milling cutter and the work, which correspond to respective points of time in a time domain.

Figure 2A:
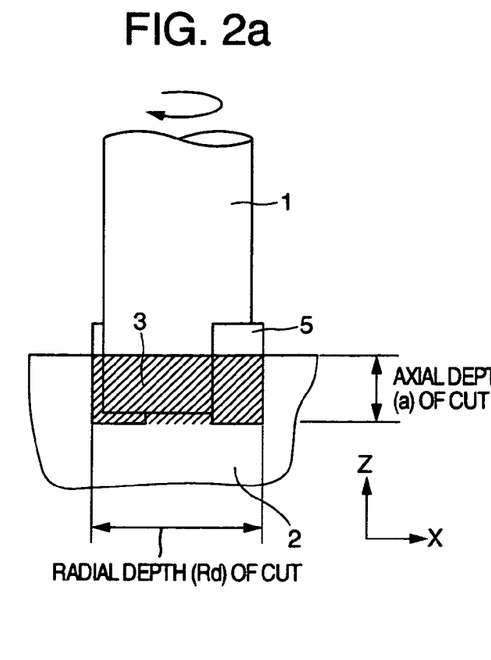
FIGS. 2a and 2b are views illustrating a state, in which a cutting of a groove is performed by the use of a milling cutter, FIG. 2a being a cross sectional view taken along a rotational axis of the milling cutter, and FIG. 2b being a top view as viewed in a direction along the rotational axis.
Figure 2B:
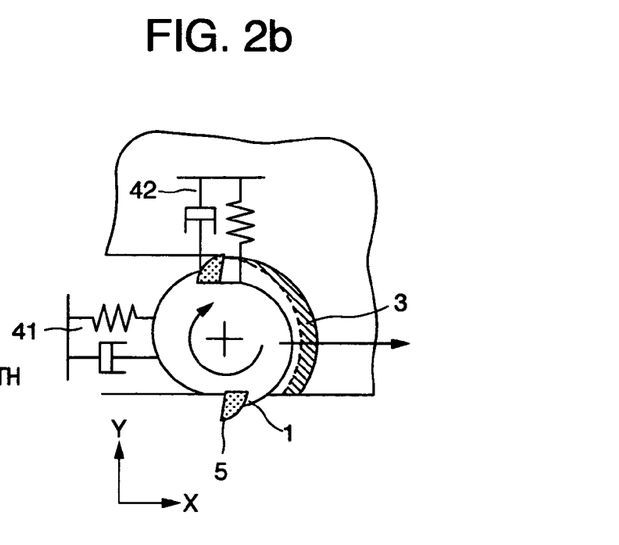
Figure 4A:
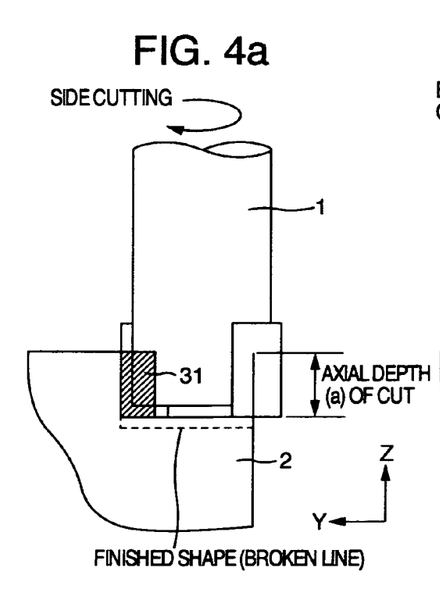
FIGS. 4a and 4b are cross sectional views illustrating a shoulder cutting of a work with the use of a milling cutter, FIG. 4a showing a finishing cut of a side surface of a L-shaped worked portion, and FIG. 4b showing a finishing cut of a bottom surface of the L-shaped worked portion.
Figure 4B:
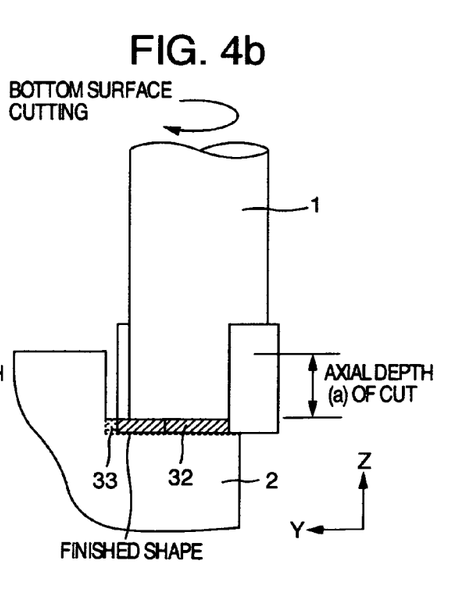

FIGS. 2a and 2b are views illustrating a state, in which a grooving work is performed by the use of a milling cutter 1. FIG. 2a is a cross sectional view taken along a rotational axis of the milling cutter 1 and FIG. 2b is a top view as viewed in a direction along the rotational axis of the milling cutter 1. In this case, when a cutting area 3 (hatched portion), in which a cutting edge 5 of the milling cutter 1 cuts off the work 2, is projected in a feed direction of the milling cutter 1, a rectangular shape shown in FIG. 4a is resulted. Also, when the cutting area 3 is projected in the direction along the rotational axis of the milling cutter 1, a shape defining a part of a crescent as shown in FIG. 4b is resulted. The milling cutter 1 is analyzed by a model, which uses compliance transfer functions 41 and 42 in x and y directions.

Figure 3:
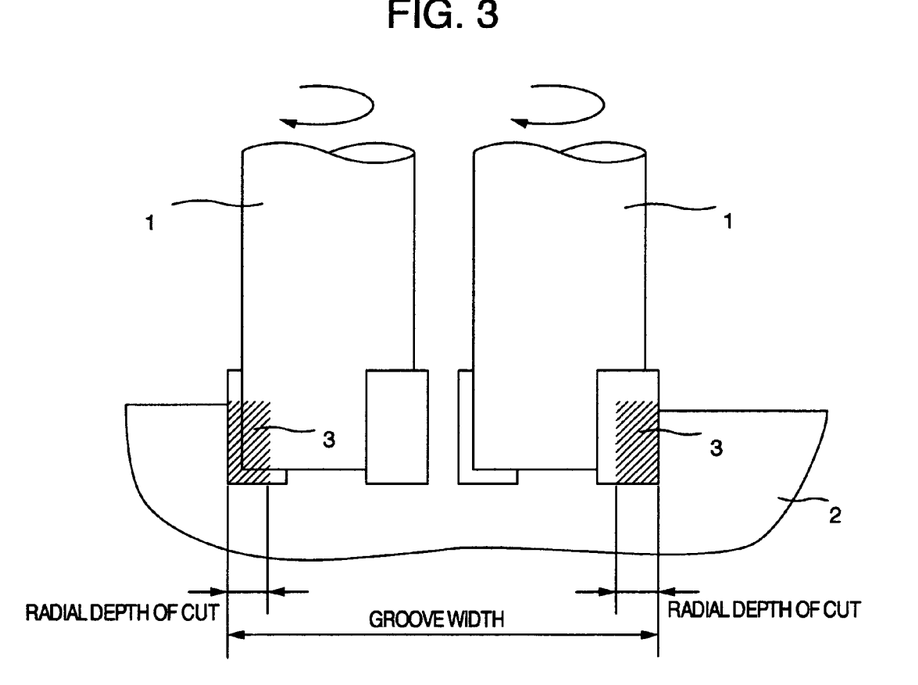
FIG. 3 is a view illustrating the case where a grooving work is performed by the use of a milling cutter and a groove width is larger than a diameter of the milling cutter.

Also, in case of further performing a finishing cut on a side of a groove of the work 2, the milling cutter 1 is moved horizontally relative to the work 2 as shown in the cross sectional view of FIG. 3 and the cutting area 3 on the left and the right of the groove is further subjected to a finishing cut.

On the other hand, FIG. 4 shows an example, in which the milling cutter is used to perform a cutting work on an L-shaped corner portion of the work. Here, in case of performing a finishing cut on a side and a bottom surface of a cut portion, on which a rough cutting is performed, it is general that after a finishing cut, in which the cutting area 31 is removed from the side of the work 2 as shown in FIG. 4a, is first performed, the milling cutter 1 is caused to separate from the side of the work 2 as shown in FIG. 4b and the milling cutter 1 is caused to cut into the bottom surface of the work 2.

In this case, since a non-cut portion 33 is formed in a region, in which the side and the bottom surface of the work 2 intersect each other, as apparent from FIG. 4b, it becomes necessary to use the milling cutter 1 to perform a cutting work on the side and the bottom surface of the work 2 in one stroke in order to restrict the non-cut portion to perform a finishing cut in two regions on the side and the bottom surface of the work 2.

As described above, in a shoulder cutting with the use of a milling cutter, self-excited vibration of the milling cutter is liable to occur at the time of a finishing cut and a finishing cut with high accuracy is difficult since a cutting area is not rectangular-shaped but L-shaped in cross section when the finishing cut is performed.

However, a conventional method of predicting a self-excited vibration can accommodate for only the case where the cutting area 3 projected in the feed direction of the rotating tool as shown in FIG. 2 is rectangular-shaped in cross section, and involves a problem that it is not possible to beforehand predict that condition, in which self-excited vibration is not generated in a finishing cut of a work, in which a cutting area is not rectangular-shaped in cross section, in other words, which has a L-shaped cross section, when a finishing cut is performed after a rough cutting. As a result, when a NC program is formed, man-hour is unlimitedly increased, which causes a bottleneck in a finishing cut in shoulder cutting.

The invention is related to an approach to prediction of self-excited vibration of cut to cope with such problem, in other words, prediction of a cutting starting position (coordinates) of a rough cutting tool so that generation of self-excited vibration is suppressed in a finishing cut and further a cutting work at the time of the finishing cut becomes maximum in efficiency.

Prior to describing specific means for solving the problem, an explanation is given to chatter-free axial depth of cut when an oscillatory type of a rotational axis in a milling cutter is maintained in a stable state.

Figure 5:
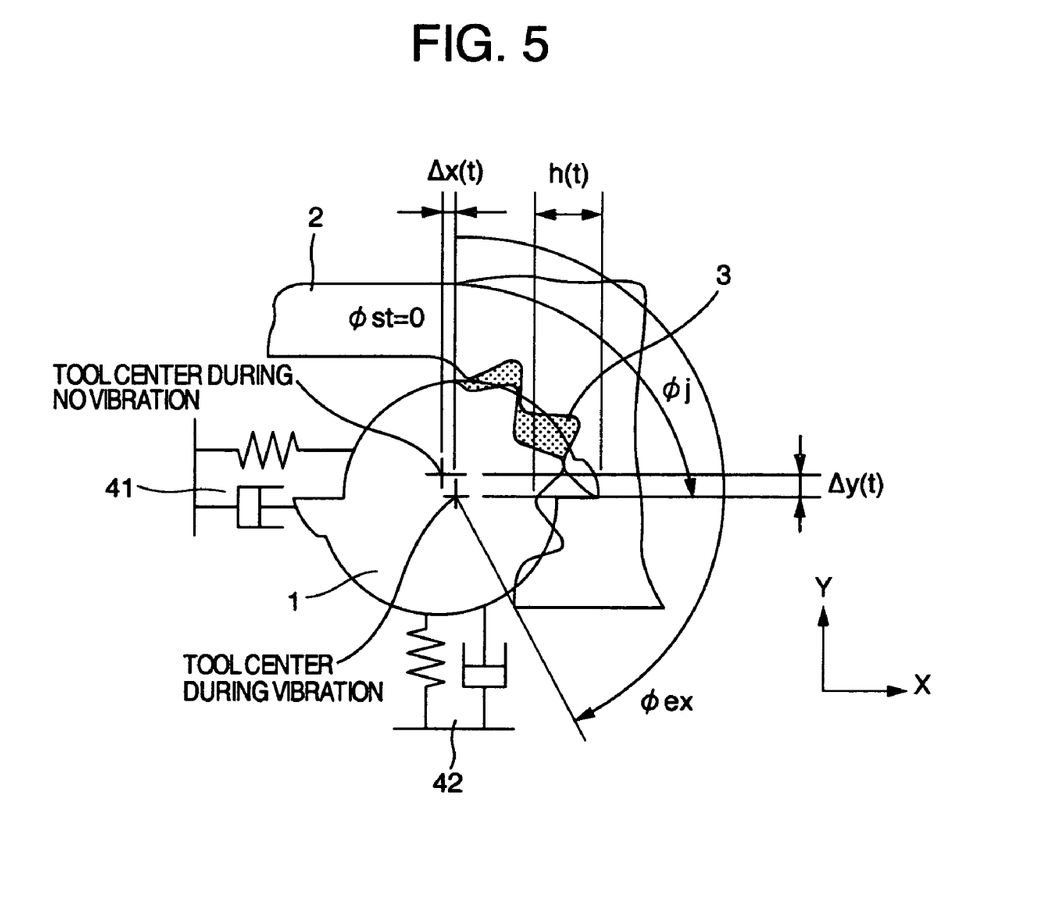
FIG. 5 is a schematic drawing illustrating a state, in which a milling cutter cuts a work while the milling cutter vibrates (case of a two-degree-of-freedom analytic model in the regenerative theory)

FIG. 5 is a drawing illustrating the case of a two-degree-of-freedom analytic model, that is, the case where a center of a tool during no vibration and the center of the tool during vibration are disposed two-dimensionally away from each other. According to the publication "Analytical Prediction of Stability Lobes in Milling", those cutting forces Fx and Fy in X direction and in Y direction, which act on a milling cutter 1, is represented by the equation (5) with the use of displacements $\Delta x$, $\Delta y$ of the milling cutter 1 during vibration in X direction and in Y direction where the X direction is a feed direction of the milling cutter.

$$\begin{bmatrix} F_x \\ F_y \end{bmatrix} = \frac{1}{2} a \cdot Kt \cdot \begin{bmatrix} a_{xx} & a_{xy} \\ a_{yx} & a_{yy} \end{bmatrix} \begin{bmatrix} \Delta x \\ \Delta y \end{bmatrix} \quad (5)$$

However, $a_{xx}$, $a_{xy}$, $a_{yx}$, $a_{yy}$, respectively, in the equation (5) are represented by the following equations (6) to (9);

$$a_{xx} = \sum_{j=0}^{N-1} -g(\phi_j)[\sin 2\phi_j + Kr(1-\cos 2\phi_j)] \quad (6)$$

$$a_{xy} = \sum_{j=0}^{N-1} -g(\phi_j)[(1+\cos 2\phi_j) + Kr\sin 2\phi_j] \quad (7)$$

$$a_{yx} = \sum_{j=0}^{N-1} g(\phi_j)[(1-\cos 2\phi_j) - Kr\sin 2\phi_j] \quad (8)$$

$$a_{yy} = \sum_{j=0}^{N-1} g(\phi_j)[\sin 2\phi_j - Kr(1+\cos 2\phi_j)]; \quad (9)$$

where, j indicates number of a cutting edge of a milling cutter, N indicates the number of cutting edges of the milling cutter, $\Phi j$ indicates a rotating angle of a j-th cutting edge of the milling cutter, a indicates an axial depth of cut of the milling cutter 1, Kt and Kr indicate cutting constants determined by a tool geometry of the milling cutter and a work material, and $a_{xx}$, $a_{xy}$, $a_{yx}$, $a_{yy}$, respectively, indicate cutting force factors in x, xy, yx, y directions and are functions of time.

Also, $g(\Phi j)$ is given by the equation (10);

$$g(\phi_j)=1 \leftarrow \phi_{st} < \phi_j < \phi_{ex}$$

$$g(\phi_j)=0 \leftarrow \phi_j < \phi_{st}, \phi_{ex} < \phi_j; \quad (10)$$

where, as shown in FIG. 5, $\Phi st$ indicates an entry angle of a cutting edge, $\Phi ex$ indicates an exit angle of a cutting edge, it is meant that the milling cutter 1 and the work 2 are in contact with each other in the range of $\Phi st < \Phi j < \Phi ex$, and it is meant that the milling cutter 1 and the work 2 are not in contact with each other in the range of $\Phi j < \Phi st$ and $\Phi j > \Phi ex$.

Further, the cutting force factors are represented by a matrix (11) and then the equation (5) is converted into the equation (12).

$$[A] = \begin{bmatrix} a_{xx} & a_{xy} \\ a_{yx} & a_{yy} \end{bmatrix} \quad (11)$$

$$\begin{bmatrix} F_x \\ F_y \end{bmatrix} = \frac{1}{2} a \cdot Kt \cdot [A] \begin{bmatrix} \Delta x \\ \Delta y \end{bmatrix} \quad (12)$$

A matrix [A] is a function of a rotating angle $\Phi j$ of the milling cutter in the equations (6) to (9), that is, a function of time during rotation. In order to make handling of the equation simple, the equation (13) is used to find a matrix $[A_0]$ of a time-invariant cutting force;

$$[A_0] = \frac{1}{T} \int_0^T [A] dt; \quad (13)$$

where, T indicates a period, during which a cutting edge of the milling cutter performs cutting, and it is shown that a cutting force is integrated over a cutting period of a cutting edge and averaged by the time. Since this is equal to one obtained by integration with respect to a pitch $\Phi p$ of a cutting edge of the milling cutter and averaging, the equation (13) is rewritten into the equation (14).

$$[A_0] = \frac{1}{\phi_p} \int_{\phi_{st}}^{\phi_{ex}} [A] d\phi \quad (14)$$

The cutting edge pitch $\Phi p$ is represented by the equation (15).

$$\phi_p = \frac{2\pi}{N} \quad (15)$$

By defining the matrix $[A_0]$ of a time-invariant cutting force as the equation (16), the following equations (17) to (20) are obtained since cutting force factors $\alpha_{xx}$, $\alpha_{xy}$, $\alpha_{yx}$, $\alpha_{yy}$, respectively, in the equation (16) are equal to ones obtained by integrating the equations (6) to (9) with respect to a rotating angle $\Phi j$.

$$[A_0] = \frac{N}{2\pi} \begin{bmatrix} \alpha_{xx} & \alpha_{xy} \\ \alpha_{yx} & \alpha_{yy} \end{bmatrix} \quad (16)$$

$$\alpha_{xx} = \frac{1}{2}[\cos 2\phi - 2K_r\phi + K_r\sin 2\phi]_{\phi_{st}}^{\phi_{ex}} \quad (17)$$

$$\alpha_{xy} = \frac{1}{2}[-\sin 2\phi - 2\phi + K_r\cos 2\phi]_{\phi_{st}}^{\phi_{ex}} \quad (18)$$

$$\alpha_{yx} = \frac{1}{2}[-\sin 2\phi + 2\phi + K_r\cos 2\phi]_{\phi_{st}}^{\phi_{ex}} \quad (19)$$

$$\alpha_{yy} = \frac{1}{2}[-\cos 2\phi - 2K_r\phi - K_r\sin 2\phi]_{\phi_{st}}^{\phi_{ex}} \quad (20)$$

Subsequently, assuming that a tool compliance transfer function $\Phi(i\omega)$ is given by the equation (21) with the use of tool compliance transfer functions $\Phi xx$, $\Phi yy$, $\Phi xy$, $\Phi yx$ in x, y, xy, and yx directions, displacements $\Delta x$, $\Delta y$ in x and y directions are given by the equation (22) with the use of the equation (21) and cutting forces Fx and Fy in x and y directions, so that a loop transfer function of a vibration system, which is composed of a milling cutter and a work and in which vibration of a cutting edge one cycle ago is fed back to a chip thickness this time by the principle of the regenerative, is represented by the equation (23).

$$[\Phi(i\omega)] = \begin{bmatrix} \Phi_{xx}(i\omega) & \Phi_{xy}(i\omega) \\ \Phi_{yx}(i\omega) & \Phi_{yy}(i\omega) \end{bmatrix} \quad (21)$$

$$\begin{bmatrix} \Delta x \\ \Delta y \end{bmatrix} = [\Phi(i\omega)]\begin{bmatrix} Fx(i\omega) \\ Fy(i\omega) \end{bmatrix} \quad (22)$$

$$F(i\omega) = \frac{1}{2}a \cdot Kt(1 - e^{i\omega T})[A_0][\Phi(i\omega)] \cdot F(i\omega) \quad (23)$$

From the loop transfer function, a characteristic equation required for discrimination of stability of the vibration system is given by the following equation (24).

$$\det\left[[I] - \frac{1}{2}Kt \cdot a \cdot (1 - e^{-i\omega T})[A_0][\Phi(i\omega)]\right] = 0 \quad (24)$$

Here, using the equations (25) and (26), the equation (24) becomes the equation (27).

$$[\Phi_0] = [A_0][\Phi(i\omega)] \quad (25)$$

$$\Lambda = -\frac{N}{4\pi}a \cdot Kt(1 - e^{-i\omega T}) \quad (26)$$

$$\det[[I] + \Lambda[\Phi_0(i\omega)]] = 0 \quad (27)$$

Here, $\Lambda$ indicates an eigenvalue of a matrix $[\Phi 0 (i\omega)]$.

As a condition that a vibration system represented by the loop transfer function in the equation (23) should be made stable, it is required that $\Lambda$ have a negative real part, so that it is possible to calculate the eigenvalue $\Lambda$ of the matrix $[\Phi 0$ $(i\omega)]$ to calculate a chatter-free axial depth a of cut for a vibration frequency $\omega$ and a tooth passing period T with the use of the equation (26).

By the way, in the conventional method of predicting a self-excited vibration, a cutting area of a work is rectangular-shaped in cross section and so a cutting force matrix in the equation (12) is modeled in numerical expression as in the equations (6) to (9), so that a matrix $[A_O]$ of a time-invariant cutting force can be represented in numerical expression as in the equations (17) to (20) by the equation (14).

In case of subjecting a side and a bottom surface of a work after rough cutting to a finishing cut in one stroke, which is an object in the invention, however, a cutting area is not rectangular-shaped but L-shaped in cross section, and therefore, analysis must be done by using different entry angles $\Phi$st and different exit angles $\Phi$ex with respect to the case where the side surface is cut, and the case where the bottom surface is cut, respectively.

SUMMARY OF THE INVENTION

Hereupon, in the invention, a compliance transfer function of a finishing cutter, a cutting constant determined by a combination of a shape of a cutting edge of the finishing cutter and a work material, a diameter of the finishing cutter, number of edges of the finishing cutter, a diameter of the rough cutter, number of edges of the rough cutter, coordinates and a range of coordinates upon starting cutting are made to be input values; subsequently, a rotating angle of the finishing cutter and coordinates of the rough cutter in the range of coordinates of the rough cutter are input; it is discriminated whether a cutting edge of the rough cutter is disposed in an area of a cross section in parallel to an axial direction of the finishing cutter and in a cutting area surrounded by a shape of the finishing cutter and a work profile shape; a cutting force is made 0 when the cutting edge is disposed outside the cutting area, and a cutting force is calculated over an overall length of the cutting edge of the finishing cutter when the cutting edge is disposed in the cutting area.

A time-invariant cutting force is calculated from a total value of a cutting force when the finishing cutter makes one revolution; a processing of discrimination of positive and negative of an eigenvalue obtained by substituting the time-invariant cutting force into a characteristic equation is performed; when the eigenvalue is negative, an efficiency of cutting performed by the use of the finishing cutter is calculated and then coordinates of the rough cutter are corrected in the coordinates range of the rough cutter and the cutting force calculating process is repeated; when the eigenvalue is positive, coordinates of the rough cutter are corrected in the coordinate range of the rough cutter and the cutting force calculating process is again repeated.

Also, the calculation of a cutting force is performed by changing a rotating angle of the finishing cutter until the finishing cutter makes one revolution.

Further, a cutting area at the time of finishing cut, which cutting area is surrounded by a shape of the finishing cutter, the work profile shape, and a profile shape of the rough cutter, is divided into minute elements, and the time-invariant cutting force is calculated by repeating a process, in which cutting forces acting on respective elements being different in an entry angle $\Phi$st and an exit angle $\Phi$ex are calculated over a whole cutting edge to find a total value, until the finishing cutter makes one revolution, and finding a cutting force acting on the finishing cutter in a period, during which the finishing cutter makes one revolution.

Thereby, in a shoulder cutting to a work having a L-shaped cross section, it is possible to appropriately find coordinates of a rough cutter at cutting work completion, in which self-excited vibration of a milling cutter in a finishing cut is suppressed and a stable cutting is made possible.

As described above, first, given a diameter D' of a rough cutter, a position O' (y', z') in a rough cutting, a diameter D of a finishing cutter, an upper limit zq of a cutting area, a work end yq in a diametrical direction, a matrix [$\Phi 0$ (i$\omega$)] of a compliance transfer function of the cutters, the number of cutting edges of the finishing cutter, and cutting constants Kt, Kr, it is possible to predict the presence of generation of self-excited vibration under the given condition, thus enabling finding a position at the time of the rough cutting, in which self-excited vibration is not generated and the working efficiency is made maximum.

Other objects, features, and advantages of the invention will become apparent from the following description of an embodiment of the invention with respect to the accompanying drawings.

DETAILED DESCRIPTION OF THE INVENTION

A method of finding coordinates of a rough cutter at cutting completion, the coordinates enabling stable finishing cut by a milling cutter, in which self-excited vibration of the milling cutter can be suppressed and high work efficiency can be provided, in the case where a cutting area of a work has a L-shaped cross section as shown in FIGS. 4a and 4b will be described in detail below with reference to the drawings.

Figure 6:
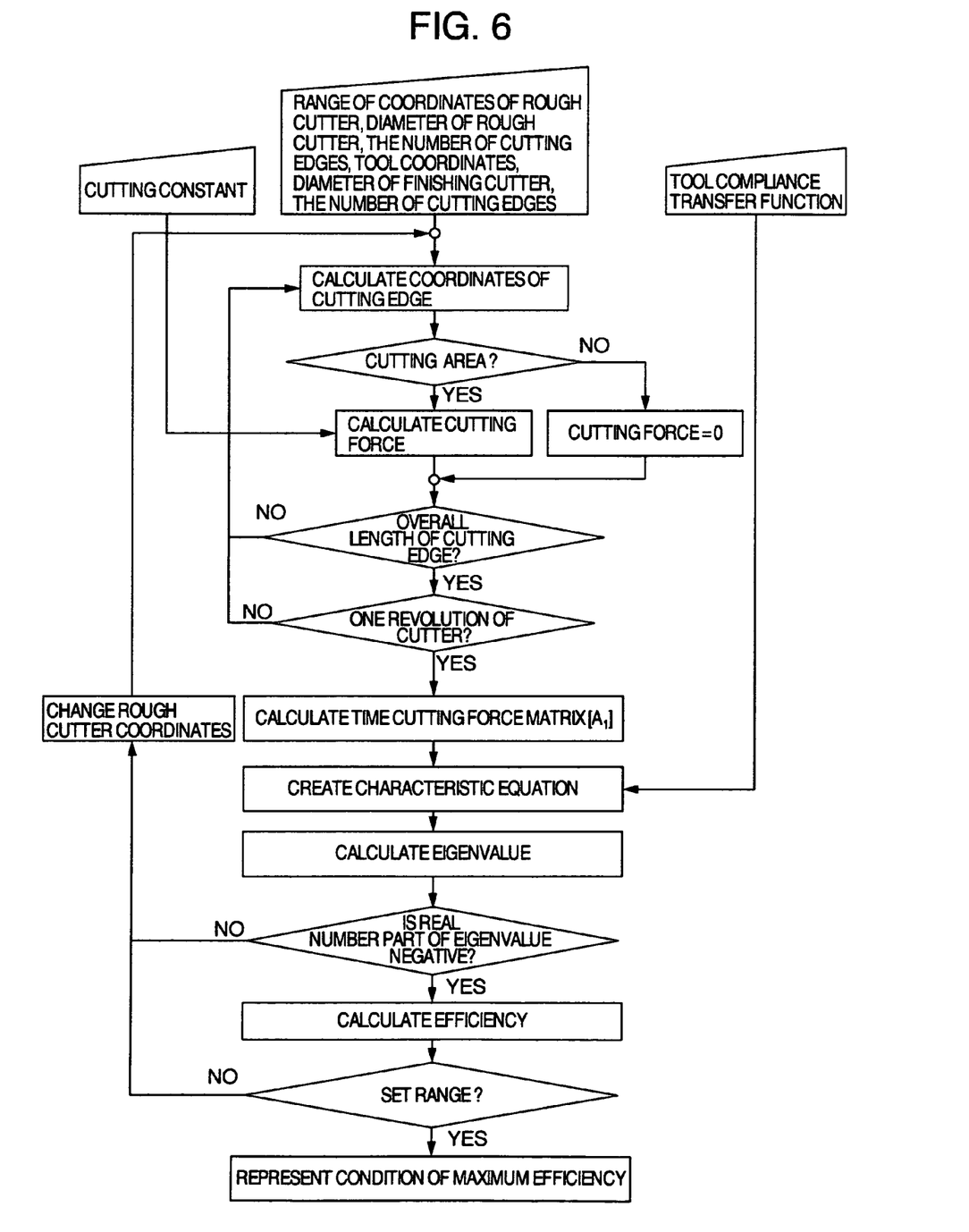
FIG. 6 is an analysis flowchart for calculating those positions of coordinates of a rough cutter at cutting work completion, which prevents a milling cutter from generating self-excited vibration.

FIG. 6 shows an analysis flowchart in the invention. There are first given parameters required for analysis, that is, a cutting constant determined by a combination of a cutting edge shape of a milling cutter and a work material, a tool diameter of and a number of edges of a finishing cutter, a compliance transfer function, a tool diameter of and a number of edges of a rough cutter, tool coordinates of the rough cutter, and a coordinate range, in which the rough cutter can be made present.

Subsequently, the input values and a rotating angle of the finishing cutter are input, and coordinates of a cutting edge of the finishing cutter corresponding to the rotating angle are calculated every minute element when a cutting area is divided into the minute elements. It is discriminated on the basis of the cutting edge coordinates whether a cutting edge of the rough cutter is disposed in the cutting area surrounded by a shape of the finishing cutter and a work profile shape, and when the cutting edge is disposed in the cutting area, a cutting force acting over an overall length of the cutting edge of the finishing cutter is calculated. Of course, when the cutting edge of the rough cutter is disposed outside the cutting area, cutting force acting on the cutting edge of the finishing cutter is defined to be 0.

Here, in the cutting force of the finishing cutter calculating process, the procedure from a step of calculating coordinates, in which the cutting edge of the finishing cutter is positioned, to a step of calculating a cutting force acting on the overall cutting edge is repeated every rotating angle of the finishing cutter, a cutting force acting on the finishing cutter in a period, during which the finishing cutter makes one revolution, is calculated for one revolution of the finishing cutter, and a time-invariant cutting force of the finishing cutter is found from a total value thereof.

Subsequently, a value of the time-invariant cutting force thus found is substituted into a characteristic equation and a stability discrimination process of cutting to discriminate positive and negative of an eigenvalue thus obtained is performed. At this time, in the case where a real number part of the eigenvalue thus obtained is positive, self-excited vibration of the milling cutter is generated with the result that it is determined that the cutting with the use of the finishing cutter is not performed stably on the L-shaped cross section portion, and returning to the cutting force calculating process, coordinate values of the rough cutter are again changed to repeatedly calculate cutting force acting on the cutting edge of the finishing cutter.

On the other hand, in the case where a real number part of the eigenvalue is negative, it is determined that self-excited vibration is not generated during cutting and stable cutting is performed, and the efficiency in the cutting is calculated. Consecutively, returning to the cutting force calculating process described above, coordinate values of the rough cutter are again changed to calculate a cutting force acting on the cutting edge of the finishing cutter, and the stability discrimination process of an eigenvalue obtained from the characteristic equation and besides the efficiency calculating process are repeatedly carried out.

Contents of processes in the flowchart shown in FIG. 6, in particular, a method of calculating a cutting force acting on the milling cutter and discriminating whether the milling cutter generates self-excited vibration, and a method of calculating the efficiency in a finishing cutter will be described in detail below with reference to the drawings.

Figure 7A:
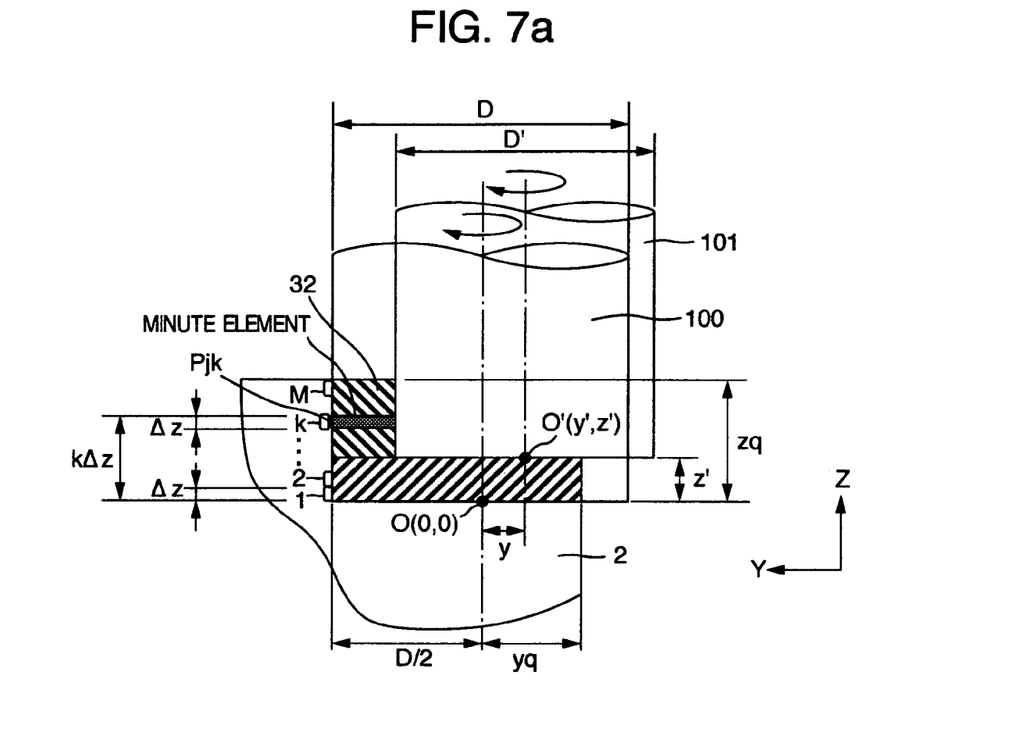
FIGS. 7a and 7b are views illustrating the relationship between a rough cutter and a finishing cutter and parameters required for analysis shown in FIG. 6, FIG. 7a being a cross sectional view taken along a rotational axis of a milling cutter, and FIG. 7b being a top view viewed in a direction along the rotational axis.
Figure 7B:
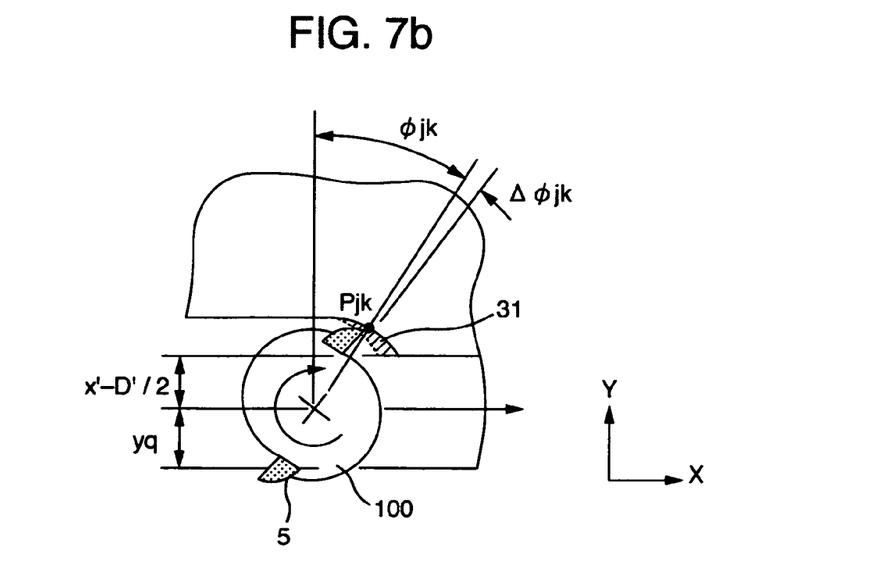

FIGS. 7a and 7b schematically show a situation when a rough cutter is used to cut a shoulder of a work 2 shown in FIGS. 4a and 4b and then a finishing cutter is used to perform cutting on a bottom surface and a side surface of the work 2 formed on the shoulder. FIG. 7a is a cross sectional taken along a rotational axis of a milling cutter and FIG. 7b is a top view viewed in a direction along the rotational axis of the milling cutter.

In FIG. 7a, assuming that finishing cutting is completed, D indicates a diameter of a finishing cutter 100 and O (0, 0) in a Y-Z plane indicates a central position. D' indicates a diameter of a rough cutter 101 in a rough cutting process performed prior thereto and O' (y', z') indicates a position in a rough cutting.

Subsequently, a length zq of a cutting edge of the finishing cutter 100 is divided into minute elements Δz. At this time, 1 indicates a minute element disposed on a most bottom surface side and cutting areas 31, 32 are divided into M minute elements. However, the cutting areas 31, 32, respectively, indicate cutting areas having a rectangular cross section on a bottom surface side and a rectangular cross section on a side surface side, which define a cutting area having a non-rectangular cross section (L-shaped cross section).

Accordingly, for a cutting edge length zq in FIG. 7a, a length Δz of a minute element is represented by the equation (28).

$$\Delta z = \frac{zq}{M} \tag{28}$$

Also, assuming that N indicates the number of cutting edges and ω indicates a rotating angular speed of the cutter for a k-th minute element of a j-th cutting edge, a rotating angle Φjk of the cutting edge in the cutting area 31 of FIG. 7b is represented at a point of time t by the equation (29). Also, a cutting edge angle Φjk in the cutting area 32 is represented in the same manner as the equation (29).

$$\phi_{jk} = \omega t \tag{29}$$

For the rotating angle Φjk with Y axis being 0°, coordinates Pjk (Px, Py, Pz) of the cutting edge is represented by the following equation (30) as shown in FIG. 7b.

$$\begin{bmatrix} Px \\ Py \\ Pz \end{bmatrix} = \begin{bmatrix} \frac{D}{2}\sin\phi_{jk} \\ \frac{D}{2}\cos\phi_{jk} \\ k\Delta z \end{bmatrix} \tag{30}$$

Here, a range, in which Pz changes in the cutting area 31 and the cutting area 32 of the work 2, establishes $k\Delta z \leq z'$ in the cutting area 31 on the bottom surface side and $k\Delta z > z'$ in the cutting area 32 on the side surface side as shown in FIG. 7a.

Further, a range, in which Py is in contact with the work, is represented by $-yq \leq Py \leq D/2$ in the cutting area 31 and $D'/2 - y' \leq Py \leq D/2$ in the cutting area 32 where yq indicates a distance from a center of the finishing cutter 100 to a work end surface.

From the above, ranges, in which coordinates Pz and Py of a cutting edge can be made present, are represented by the equations (31) and (32).

$$k\Delta z \leq z' \text{ and } yq \leq Py \leq \frac{D}{2} \tag{31}$$

$$k\Delta z > z' \text{ and } \frac{D'}{2} - y' \leq Py \leq \frac{D}{2} \tag{32}$$

Accordingly, in the case where a k-th minute element Pjk out of M minute elements, into which a j-th cutting edge is divided, meets the equation (31) or (32), it is possible to discriminate that a cutting edge Pjk is disposed inside the cutting area.

According to the discriminating method, in the case where a cutting edge of the finishing cutter is disposed in the cutting area, cutting forces Fx' and Fy', in x direction and in y direction, acting on a whole cutting edge at an any cutter rotating angle Φjk can be represented by the equation (33), in which (a) in the equation (5) is replaced by Δz. Here, cutting constants axx, axy, ayx, ayy in x, xy, yx, y directions are represented by the equations (34) to (37), respectively.

$$\begin{bmatrix} F'_x \\ F'_y \end{bmatrix} = \sum_{k=1}^{M} \frac{1}{2} \Delta z \cdot Kt \cdot \begin{bmatrix} a_{kxx} & a_{kxy} \\ a_{kyx} & a_{kyy} \end{bmatrix} \begin{bmatrix} \Delta x \\ \Delta y \end{bmatrix} \tag{33}$$

$$a_{kxx} = \sum_{j=0}^{N-1} -g(\phi_j)[\sin 2\phi_j + Kr(1 - \cos 2\phi_j)] \tag{34}$$

$$a_{kxy} = \sum_{j=0}^{N-1} -g(\phi_j)[(1 + \cos 2\phi_j) + Kr\sin 2\phi_j] \tag{35}$$

$$a_{kyx} = \sum_{j=0}^{N-1} g(\phi_j)[(1 - \cos 2\phi_j) - Kr\sin 2\phi_j] \tag{36}$$

$$a_{kyy} = \sum_{j=0}^{N-1} g(\phi_j)[\sin 2\phi_j - Kr(1 + \cos 2\phi_j)] \tag{37}$$

However, g(Φj) is represented by the equation (38), in which the equations (31) and (32) are used to represent a range of Φj in the equation (10).

$$g(\phi_{jk}) = 1 \leftarrow k\Delta z \leq z', yq \leq Py \leq \frac{D}{2} \tag{38}$$

or, $$k\Delta z > z', \frac{D'}{2} - y' \leq Py \leq \frac{D}{2}$$

$$g(\phi_{jk}) = 0 \leftarrow k\Delta z \leq z', Py < yq$$

or, $$k\Delta z > z', Py < \frac{D'}{2} - y'$$

Here, it suffices to calculate cutting forces Fx' and Fy', which act on the cutting edge while determining whether the equations (34) to (37) are inside the cutting area by the equation (38) and while changing $\Phi_j$ every minute angle $\Delta\Phi_j$ obtained by dividing one revolution of the tool, that is, $2\pi$ (rad) into 1 sections, so that cutting forces Fx, Fy of a whole cutting edge acting in a period, during which the finishing cutter makes one revolution, can be represented by the equation (39). Therefore, the equation (40) represents a time-invariant cutting force in the invention.

$$\begin{bmatrix} F_x \\ F_y \end{bmatrix} = \frac{N}{2\pi} \sum_{j=1}^{t} \Delta\phi_j \sum_{k=1}^{M} \frac{1}{2}\Delta z \cdot Kt \cdot \begin{bmatrix} a_{kxx} & a_{kxy} \\ a_{kyx} & a_{kyy} \end{bmatrix} \begin{bmatrix} \Delta x \\ \Delta y \end{bmatrix} \quad (39)$$

$$[A_1] = \frac{N}{2\pi} \sum_{j=1}^{t} \Delta\phi_j \sum_{k=1}^{M} \frac{1}{2}\Delta z \cdot Kt \cdot \begin{bmatrix} a_{kxx} & a_{kxy} \\ a_{kyx} & a_{kyy} \end{bmatrix} \quad (40)$$

Also, since Loop Transfer Function is represented by the equation (41), the characteristic equation is given by the equation (42).

$$F(i\omega) = (1-e^{i\omega T})[A_1][]\Phi(i\omega)] \cdot F(i\omega) \quad (41)$$

$$det[[I]-(1-e^{-i\omega T})[A_1][]\Phi(i\omega)]] = 0 \quad (42)$$

Here, the equation (45) is deduced by substituting the equations (43) and (44) into the equation (42), an eigenvalue $\Lambda$ of a matrix $[(\Phi 0 (i\omega)]$ is found, and when a real number part of the eigenvalue $\Lambda$ is negative, it is meant that self-excited vibration of the finishing cutter 100 is not generated and the finishing cut is stably performed. On the other hand, in the case where a real number part of the eigenvalue $\Lambda$ is positive, the finishing cutter 100 generates self-excited vibration during the finishing cut and so it is not possible to perform a stable cutting.

$$[\Phi_0] = [A_1][]\Phi(i\omega)] \quad (43)$$

$$\Lambda = 1 - e^{-i\omega T} \quad (44)$$

$$det[[I]+\Lambda[\Phi_0(i\omega)]] = 0 \quad (45)$$

Subsequently, an explanation will be given to a method of calculating the efficiency by a finishing cutter.

As described above, in the case where the cutting is stably performed, the efficiency therefor is calculated. The magnitude correlation in the efficiency can be determined by comparison of an area of the cutting area projected in a feed direction of the milling cutter.

As shown in FIG. 7a, a range, in which coordinates of the rough cutter can be made present, in a z direction is given by the equation (46).

$$0 < z' < zq \quad (46)$$

Figure 8:
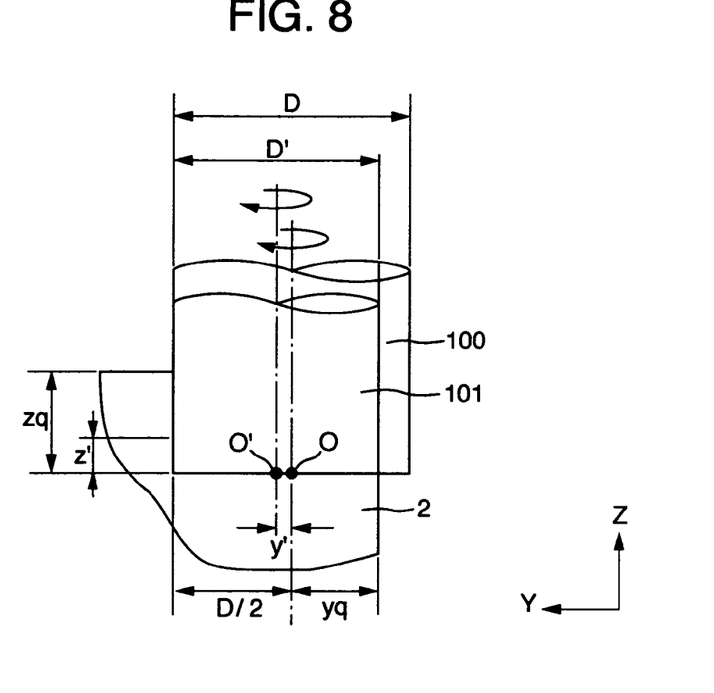
FIG. 8 is a view showing a position of a rough cutter when a cutting area in a finishing cut becomes the minimum in the present invention.

Also, as apparent from the arrangement of the milling cutters shown in FIG. 8, a case where the cutting area in Y direction becomes minimum is the time when the finishing cutter 100 and the rough cutter 101 agree with each other on a side surface portion of the cutting area of the work 2, and a range thereof is given by the equation (47).

$$y' = \frac{D}{2} - \frac{D'}{2} \quad (47)$$

Figure 9:
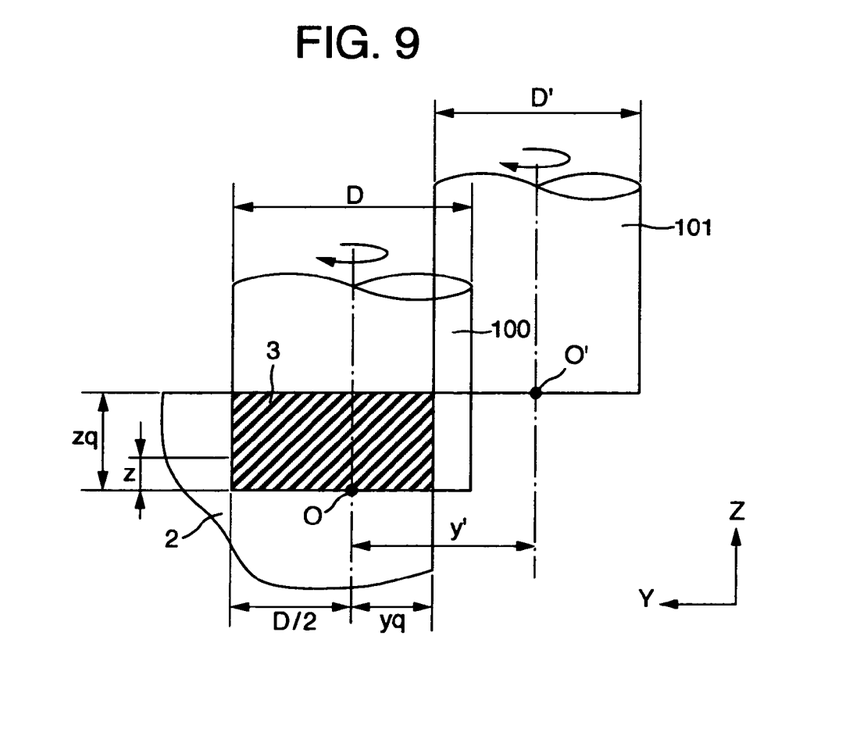
FIG. 9 is a view showing a position of a rough cutter when a cutting area in a finishing cut becomes the maximum in the present invention.

On the other hand, from the arrangement of the milling cutters shown in FIG. 9, a case where the cutting area becomes maximum is the time when an edge point of the rough cutter 101 is positioned at an end of the work 2 and a range thereof is given by the equation (48).

$$y' = yq + \frac{D'}{2} \quad (48)$$

Accordingly, an area S (area represented by the sum of the cutting areas 31, 32 and indicated by hatched portions in FIG. 7a) composed of the cutting area 31 and the cutting area 32 shown in FIG. 7a and projected in a feed direction of the finishing cutter 100 is found in a coordinate range of the rough cutter of the equations (46) to (48) by the equation (49) in FIG. 7a. Accordingly, the larger the projected area S, the larger metal removal rate of the milling cutter in a finishing cut, so that a high efficiency results.

$$S = zq \cdot \left(\frac{D}{2} + yq\right) - (zq - z')\left(\frac{D'}{2} + yq - y'\right) \quad (49)$$

In this manner, coordinates z', y' of a center of rotation of the rough cutter are changed in a range, which is set in the manner described above and in which coordinates of the rough cutter can be changed in the rough cutting, and calculation is repeated. Then z', y', in which the efficiency becomes maximum in the set range under all stable conditions, are represented.

As described above, by first using the diameter D' of the rough cutter 101, the position O' (y', z') in a rough cutting, the diameter D of the finishing cutter 100, an upper limit zq of the cutting area, a work end yq in a diametrical direction, the matrix $[\Phi 0 (i\omega)]$ of a compliance transfer function of the cutter, the number of cutting edges of the finishing cutter, and cutting constants Kt, Kr, a matrix [A1] of a time-invariant cutting force of the finishing cutter 100 is calculated from the equation (40), a matrix $[\Phi 0 (i\omega)]$ is obtained by substituting the results of the equation (40) into the equation (43), and on the basis of a numeric value of the eigenvalue $\Lambda$ obtained as a result thereof, it becomes possible to determine the presence of self-excited vibration of the finishing cutter 100 during cutting.

By changing the position O' of the rough cutter in a set range, repeating the procedure from the calculation of the cutting edge coordinates to the calculation of the eigenvalue, and further repeating the process of determining whether self-excited vibration of the finishing cutter occurs, it is possible to find those coordinates of the rough cutter at cutting completion in a process of a rough cutting, in which self-excited vibration does not occur and the efficiency becomes maximum. In other words, it is possible to estimate a cutting termination position of the rough cutter for a finished shape, that is, a cutting region, in which a finishing cutting is stably and efficiently performed.

Figure 10:
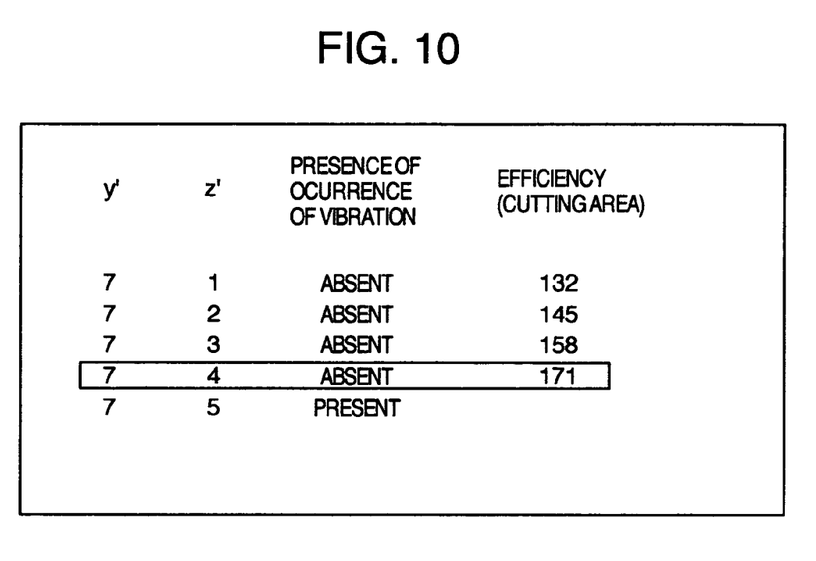
FIG. 10 is a view showing an example of an analysis result obtained according to the flowchart shown in FIG. 6.

FIG. 10 shows an example indicating coordinates y', z' of the rough cutter at cutting work completion, which are calculated according to the flowchart shown in FIG. 6, the presence of self-excited vibration of the finishing cutter at this time, and an area of a cutting area as efficiency with no occurrence of vibration.

A shoulder cutting of aluminum alloy was performed under that cutting condition, in which the diameter D' of the rough cutter and the diameter D of the finishing cutter were 25 mm and the cutters were of two edge structure. As apparent from the results thereof, y'=7 (mm) and z'=4 (mm) for coordinates of the rough cutter at cutting work completion are selected as that condition, in which the efficiency by the finishing cutter becomes maximum, and the condition is represented as being surrounded by a frame. Also, while the example indicates the case where y'>z', it is possible to obtain that analysis result, in which the efficiency in case of y'<z' becomes maximum, in the same manner.

Figure 11A:
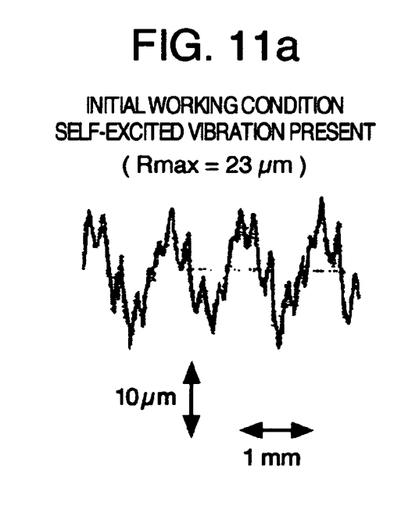
FIGS. 11a and 11b show test results for illustrating an example of a shoulder cutting of a work, FIG. 11a illustrating a case of cutting under that condition, in which self-excited vibration of a milling cutter is generated, and FIG. 11b illustrating a case of cutting under that condition, in which generation of self-excited vibration can be suppressed.

FIG. 11 shows an example of actual cutting. A work (aluminum alloy) was cut to have a L-shaped cross section being 20 mm in width and 17 mm in length and FIG. 11a shows an example of cutting under that condition, in which a finishing cutter generates self-excited vibration, and a cut surface has the surface roughness of Rmax=23 μm.

Figure 11B:
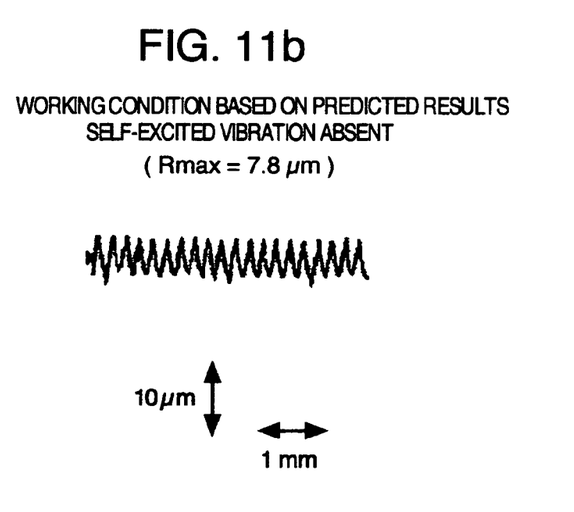

On the other hand, FIG. 11(b) shows results of cutting under the condition surrounded by a frame in FIG. 10, that is, that condition, in which self-excited vibration of a finishing cutter is not generated. As a result, a surface subjected to the cutting and being very excellent in flatness to have the surface roughness of Rmax=7.8 μm could be realized.

As described above, in case of a shoulder cutting of a work, which is free in one part, through a process of rough cutting and finishing cutting with accuracy, the analysis method according to the invention is used to define positions of coordinates of a rough cutter at cutting work completion whereby a finishing cut being a next process can be performed efficiently in a stable state without occurrence of self-excited vibration of a milling cutter. Further, when that cutting condition, in which self-excited vibration of a milling cutter is not occurred, can be beforehand known, a period of time required for correction of a NC program, etc. can be shortened and a great effect is produced on an improvement in productivity in the field of cutting work.

While the embodiment has been described, it is apparent to those skilled in the art that the invention is not limited thereto but various modifications and corrections can be made within the spirit of the invention and a scope of the appended claims.

The invention claimed is:

1. A method of calculating coordinates of a rotatable rough cutter at cutting work completion of a work in a process of rough cutting in a shoulder cutting of the work, in which a milling cutter is used to perform a rough cutting of the work as a rough cutter and then perform a finishing cutting of the work as a finishing cutter, comprising:

a step of making a compliance transfer function of a finishing cutter, a cutting constant determined by a combination of a cutting edge shape of the finishing cutter and a work, a diameter of the finishing cutter, the number of edges of the finishing cutter, a diameter of a rough cutter, the number of edges of the rough cutter, rough cutter coordinates when cutting of the work is begun, and a range of the rough cutter coordinates as input values;

a step of calculating cutting force including: inputting a rotating angle of the finishing cutter and the rough cutter coordinates in a set range of the rough cutter coordinates; discriminating whether a cutting edge of the rough cutter is disposed in a region of a cross section of the work in parallel to an axial direction of the finishing cutter and in a cutting area of the work surrounded by a shape of the finishing cutter and a work profile shape; making a cutting force 0 when the cutting edge is disposed outside the cutting area of the work; and calculating the cutting force over an overall length of the cutting edge of the finishing cutter when the cutting edge is disposed in the cutting area of the work; and a step of discriminating an eigenvalue including: calculating a time-invariant cutting force from a total value of the cutting force when the finishing cutter makes one revolution with respect to the work; and discriminating positive and negative of an eigenvalue obtained by substituting the time-invariant cutting force into a characteristic equation, wherein when the eigenvalue is negative, an efficiency of the cutting performed by the finishing cutter is calculated, then coordinates of the rough cutter are corrected in the coordinate range of the rough cutter, and the cutting force calculating step is repeated, and wherein when the eigenvalue is positive, coordinates of the rough cutter are corrected in the coordinate range of the rough cutter, and the cutting force calculating step is repeated.

2. The method according to claim 1, wherein in the cutting force calculating step, calculation of the cutting force is performed by changing a rotating angle of the finishing cutter with respect to the work until the finishing cutter makes one revolution.

3. The method according to claim 1, wherein a cutting area of the work at the time of finishing cut, which cutting area is surrounded by a shape of the finishing cutter, the work profile shape, and a profile shape of the rough cutter, is divided into minute elements, and the time-invariant cutting force is calculated from a total value of cutting forces acting on the finishing cutter in the respective elements in a period, during which the finishing cutter makes one revolution with respect to the work.

* * * * *